US010365553B1

(12) United States Patent
Ando et al.

(10) Patent No.: US 10,365,553 B1
(45) Date of Patent: Jul. 30, 2019

(54) PROJECTOR-USE LUMINESCENT WHEEL AND MANUFACTURING METHOD THEREFOR, AND PROJECTOR-USE LIGHT EMITTING DEVICE

(71) Applicant: NIPPON ELECTRIC GLASS CO., LTD., Otsu-shi, Shiga (JP)

(72) Inventors: Tamio Ando, Otsu (JP); Tadahito Furuyama, Otsu (JP); Shunsuke Fujita, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 0 days.

(21) Appl. No.: 16/361,275

(22) Filed: Mar. 22, 2019

Related U.S. Application Data

(63) Continuation of application No. 15/101,461, filed as application No. PCT/JP2014/083192 on Dec. 16, 2014.

(30) Foreign Application Priority Data

Dec. 27, 2013 (JP) ................................. 2013-272217
Dec. 2, 2014 (JP) ................................. 2014-244106

(51) Int. Cl.
*G03B 21/14* (2006.01)
*H04N 9/31* (2006.01)
(Continued)

(52) U.S. Cl.
CPC .............. *G03B 21/204* (2013.01); *B32B 5/16* (2013.01); *B32B 7/12* (2013.01); *B32B 9/005* (2013.01); *B32B 15/20* (2013.01); *B32B 17/061* (2013.01); *B32B 37/06* (2013.01); *B32B 37/12* (2013.01); *G02B 26/008* (2013.01); *G02B 27/141* (2013.01); *B32B 38/0012* (2013.01);
(Continued)

(58) Field of Classification Search
CPC . B32B 17/10; B32B 17/10036; B32B 26/008; B32B 37/06; B32B 37/061; B32B 37/12; H01S 3/08004; G03B 21/204
See application file for complete search history.

(56) References Cited

U.S. PATENT DOCUMENTS 9,733,557 B2 * 8/2017 Furuyama ............ G02B 26/008
9,922,621 B2 * 3/2018 Alschinger ............ G02B 1/04
(Continued)

OTHER PUBLICATIONS

Ando et al., "Projector-Use Luminescent Wheel and Manufacturing Method Therefor, and Projector-Use Light Emitting Device", U.S. Appl. No. 15/101,461, filed Jun. 3, 2016.

*Primary Examiner* — William C. Dowling
(74) *Attorney, Agent, or Firm* — Keating and Bennett, LLP

(57) ABSTRACT

Provided is a luminescent wheel for a projector, which has a novel structure in which a phosphor layer is hard to break even if its thickness is reduced; a manufacturing method therefor; and a light emitting device for a projector. A luminescent wheel for a projector includes: a phosphor layer (11) which has a first principal surface (11a) and a second principal surface (11b) located on an opposite side to the first principal surface (11a) and is capable of being excited by the entry of excitation light to emit fluorescence; a first glass layer (12) provided on the first principal surface (11a) of the phosphor layer (11); and a second glass layer (13) provided on the second principal surface (11b) of the phosphor layer (11).

13 Claims, 17 Drawing Sheets

(51) Int. Cl.
  G03B 21/20 (2006.01)
  G02B 26/00 (2006.01)
  B32B 15/20 (2006.01)
  G02B 27/14 (2006.01)
  B32B 17/06 (2006.01)
  B32B 7/12 (2006.01)
  B32B 9/00 (2006.01)
  B32B 37/06 (2006.01)
  B32B 5/16 (2006.01)
  B32B 37/12 (2006.01)
  G02B 1/11 (2015.01)
  B32B 38/00 (2006.01)

(52) U.S. Cl.
  CPC ..... *B32B 2255/205* (2013.01); *B32B 2264/10* (2013.01); *B32B 2264/107* (2013.01); *B32B 2307/204* (2013.01); *B32B 2307/412* (2013.01); *B32B 2307/416* (2013.01); *B32B 2307/422* (2013.01); *B32B 2307/732* (2013.01); *B32B 2315/08* (2013.01); *B32B 2551/00* (2013.01); *G02B 1/11* (2013.01)

(56) References Cited

U.S. PATENT DOCUMENTS

| | | | |
|---|---|---|---|
| 2011/0304830 A1* | 12/2011 | Kato | G03B 21/204 |
| | | | 353/84 |
| 2012/0299328 A1* | 11/2012 | Labrot | B32B 17/10036 |
| | | | 296/84.1 |
| 2016/0238922 A1* | 8/2016 | Furuyama | G02B 26/008 |
| 2018/0180975 A1* | 6/2018 | Furuyama | C03B 19/063 |

\* cited by examiner

[FIG. 1]
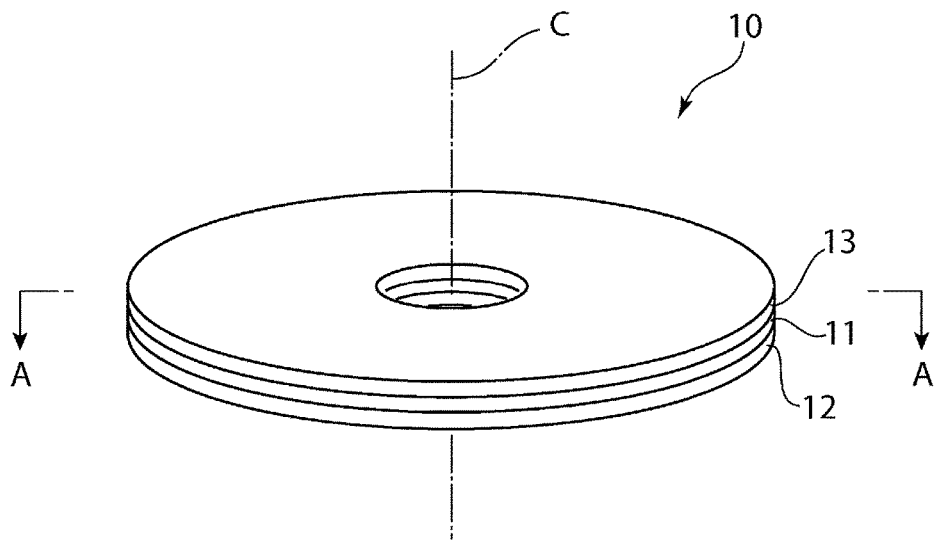
[FIG. 2]
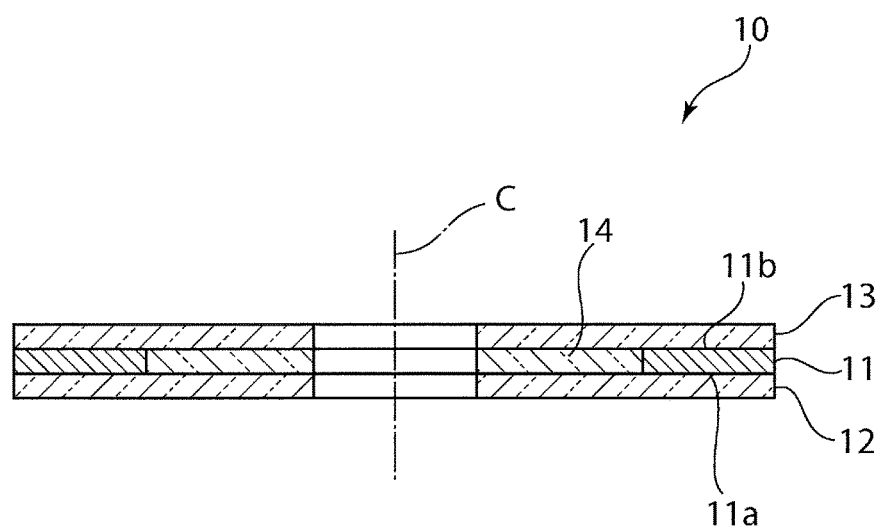

[FIG. 3]
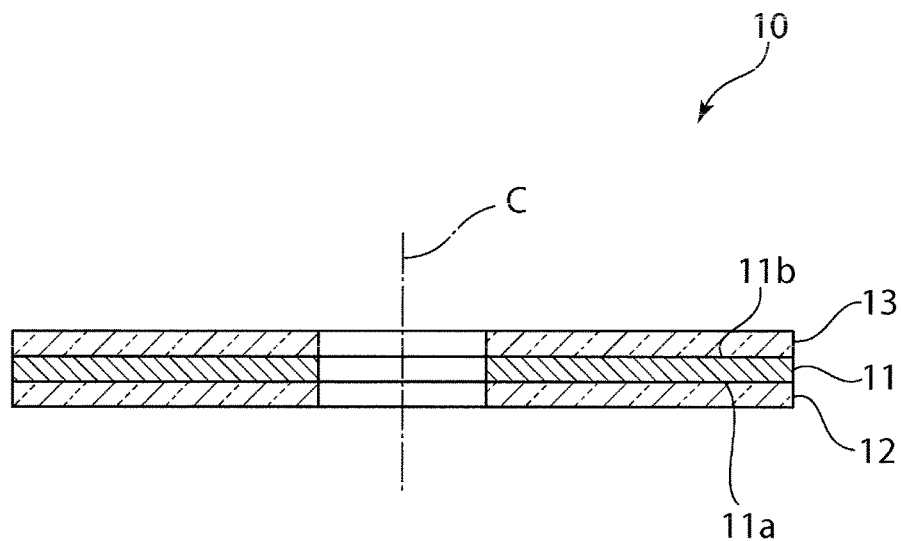
[FIG. 4]
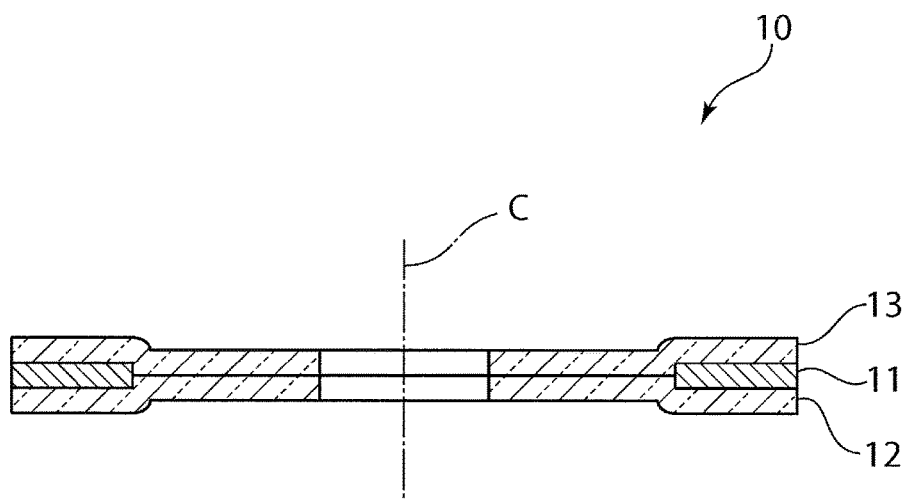

[FIG. 5]
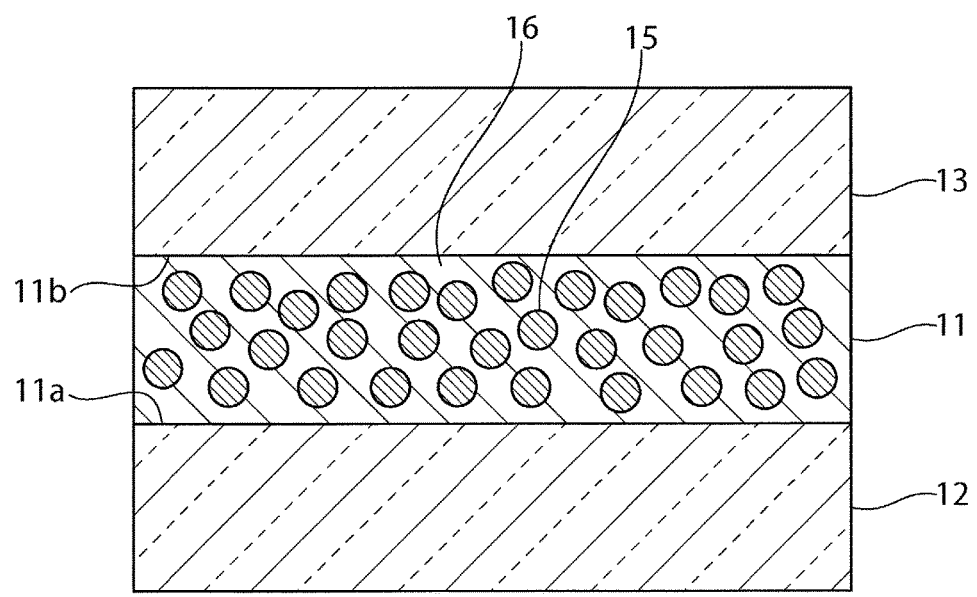

[FIG. 6]
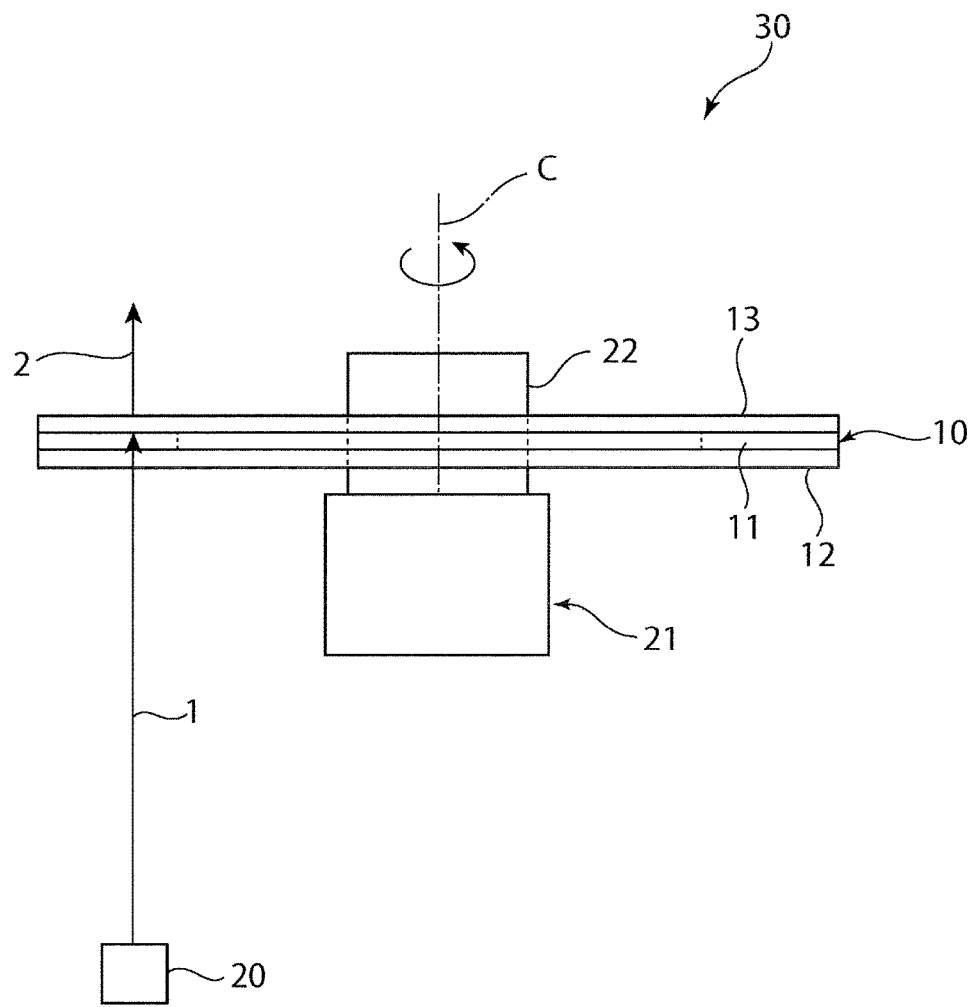

[FIG. 7]
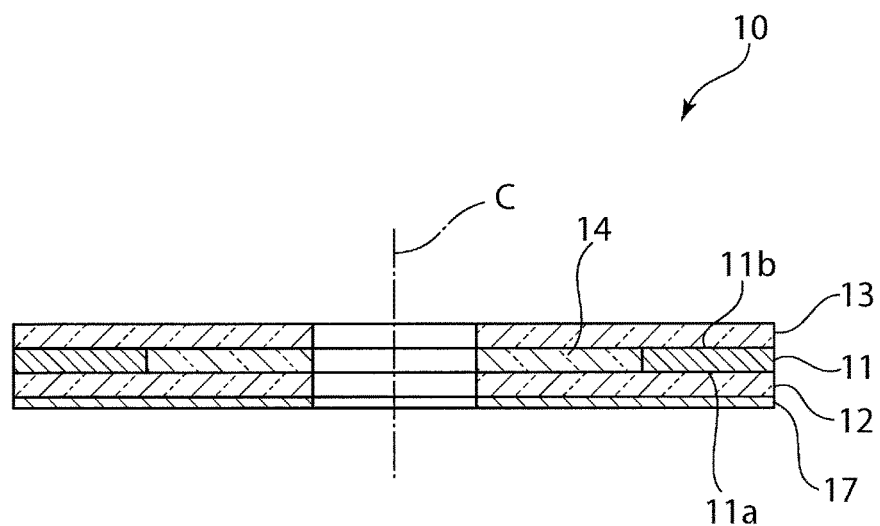
[FIG. 8]
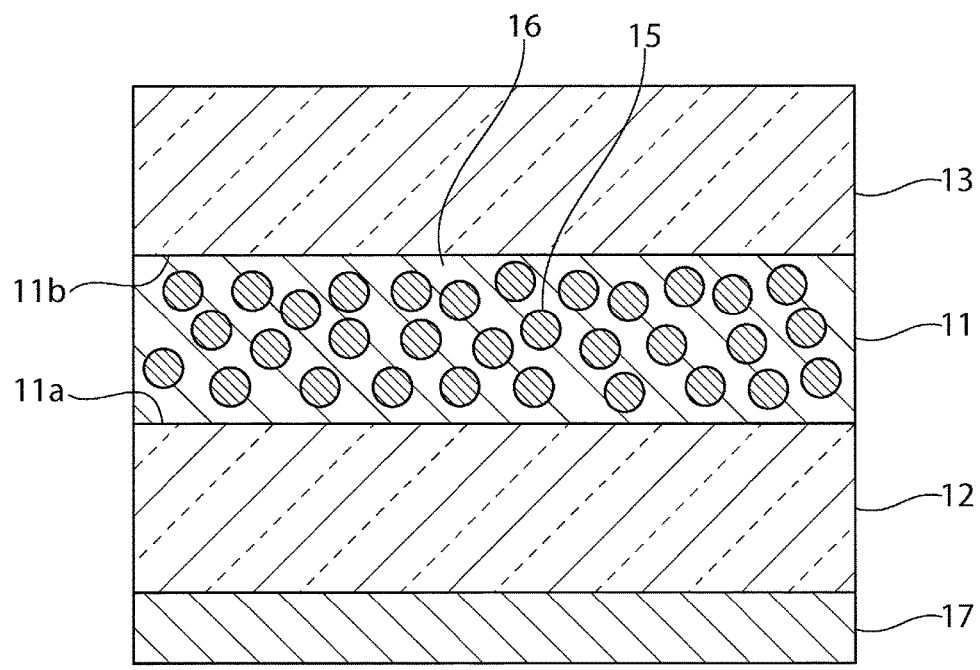

[FIG. 9]
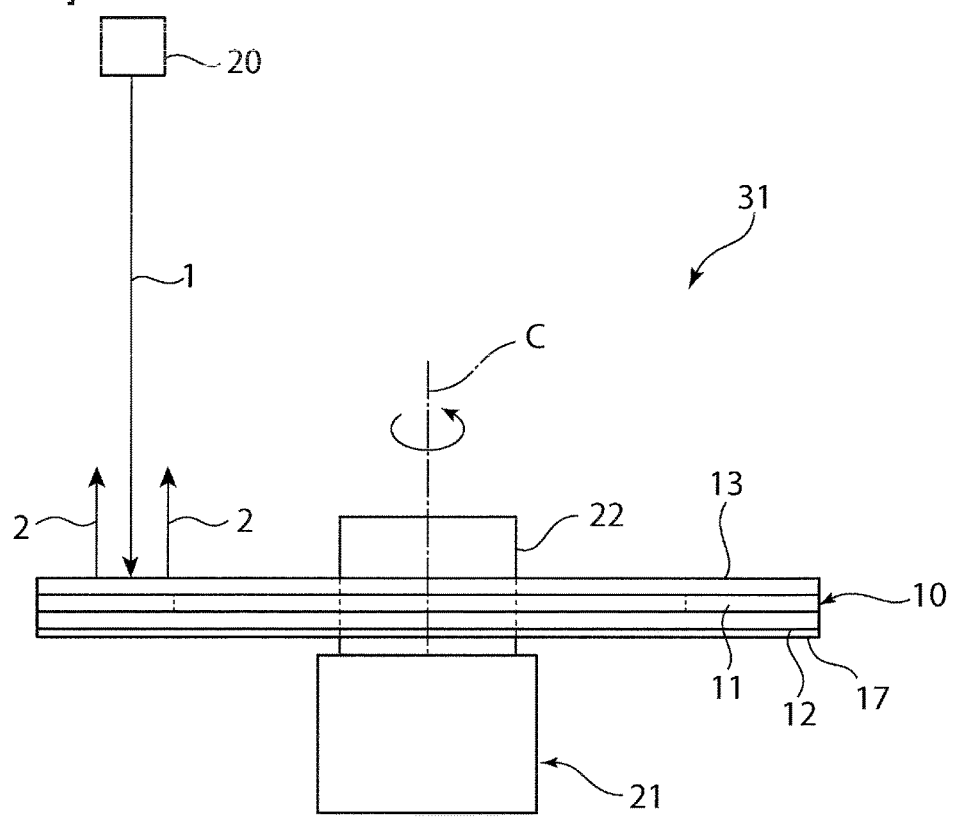

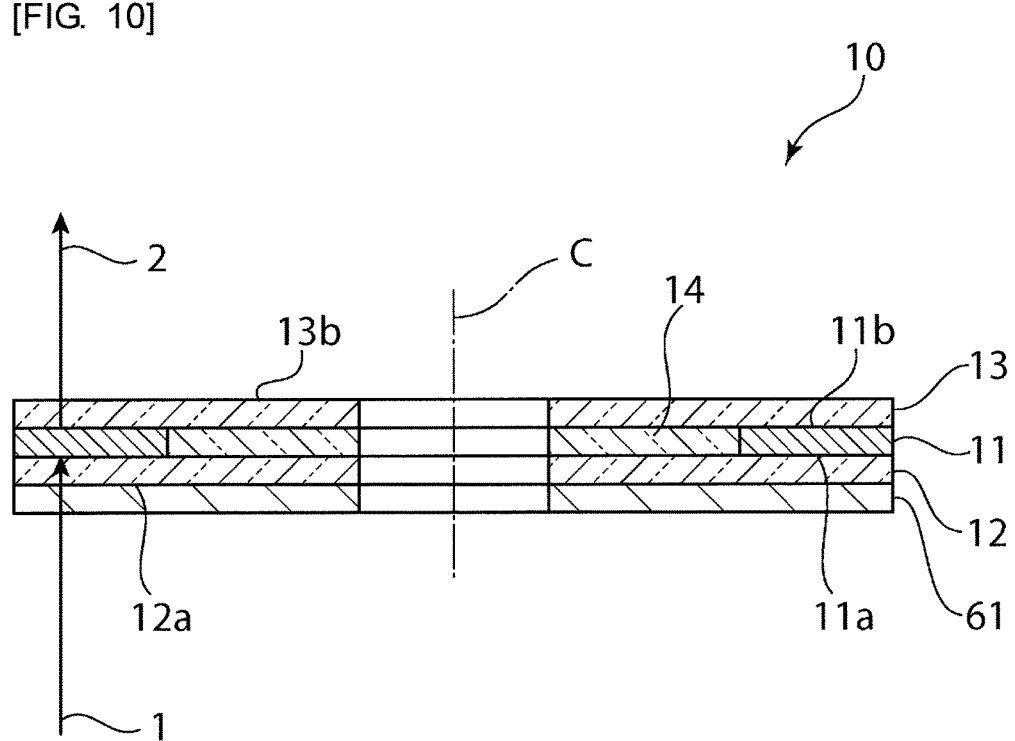
[FIG. 10]

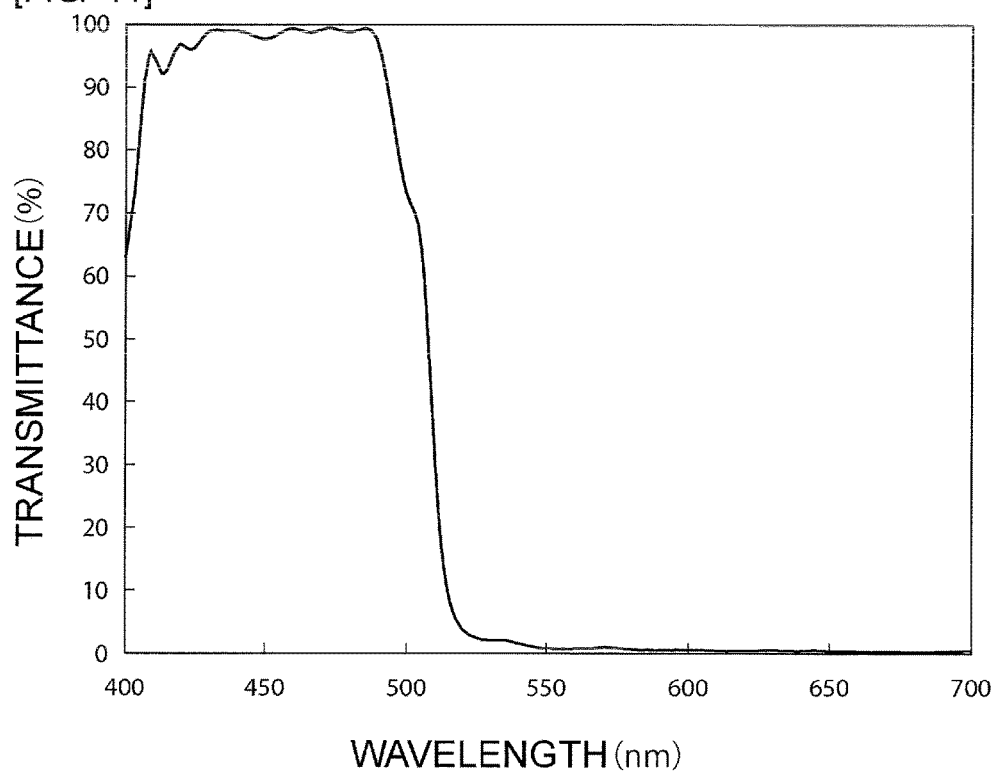
[FIG. 11]

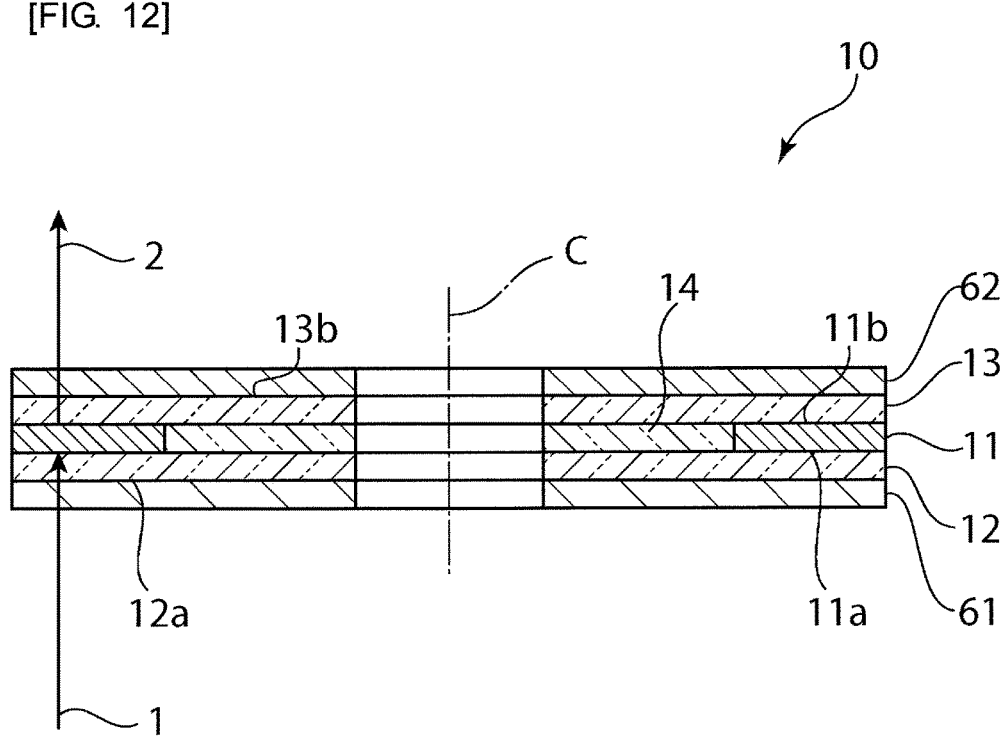
[FIG. 12]

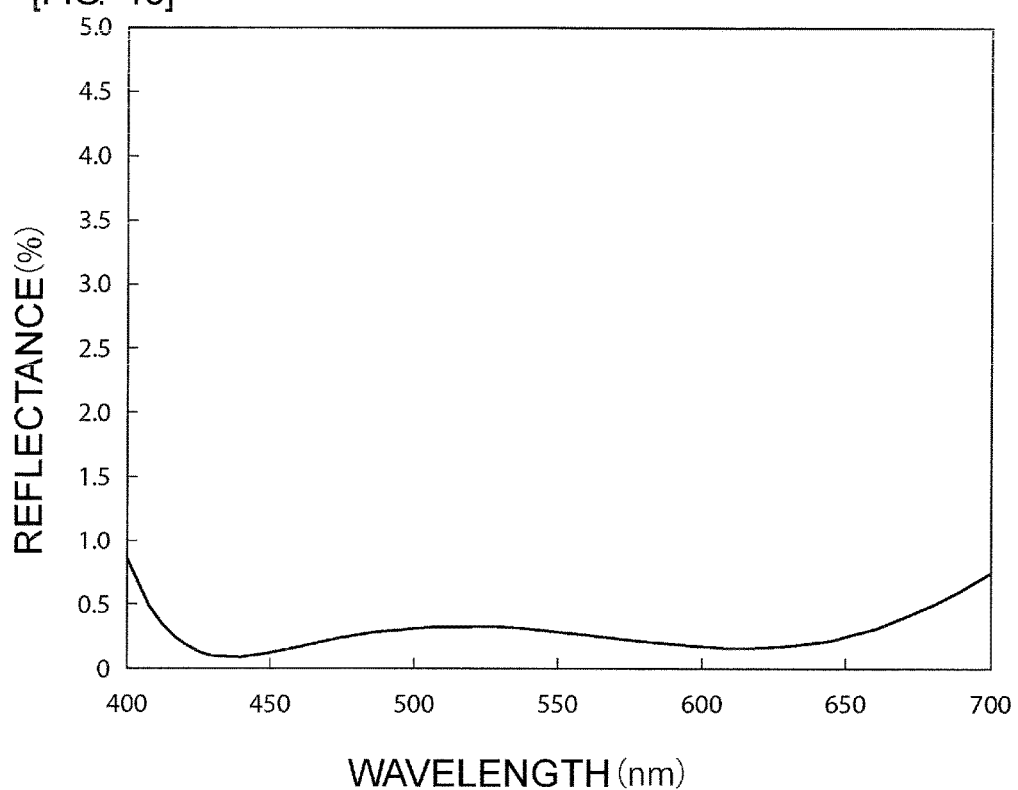

[FIG. 14]
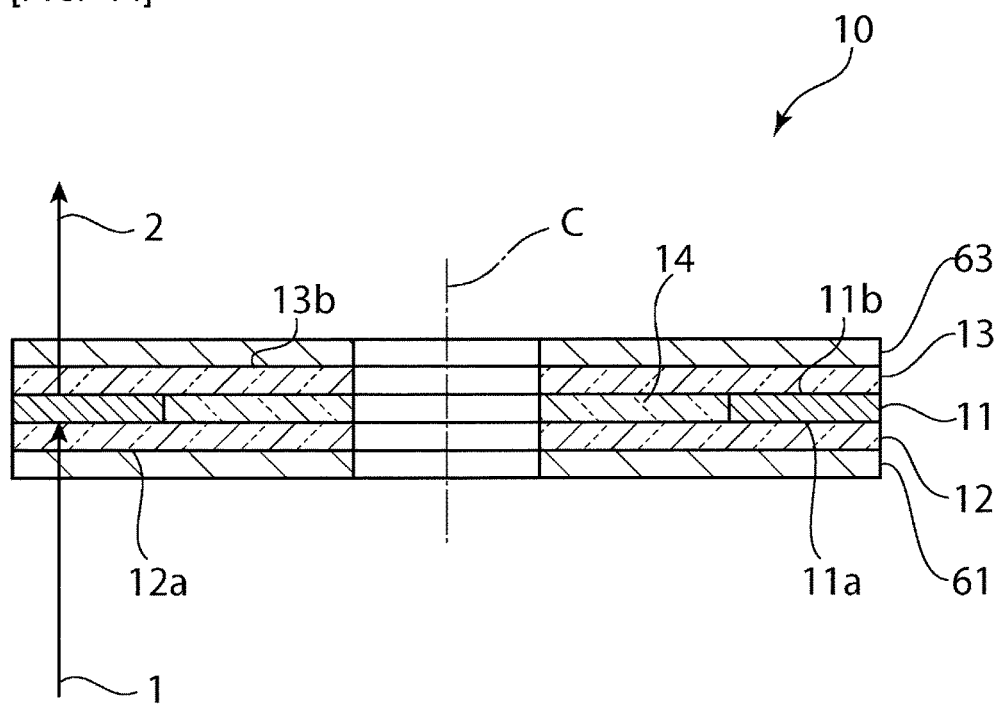

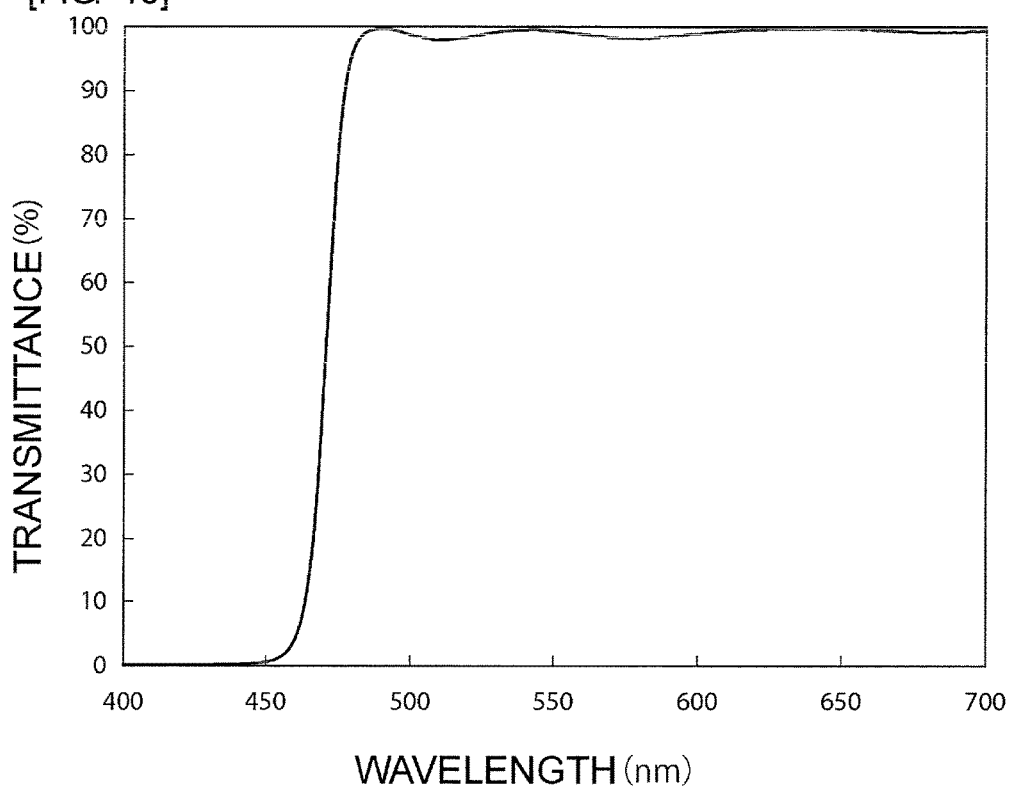

[FIG. 16]
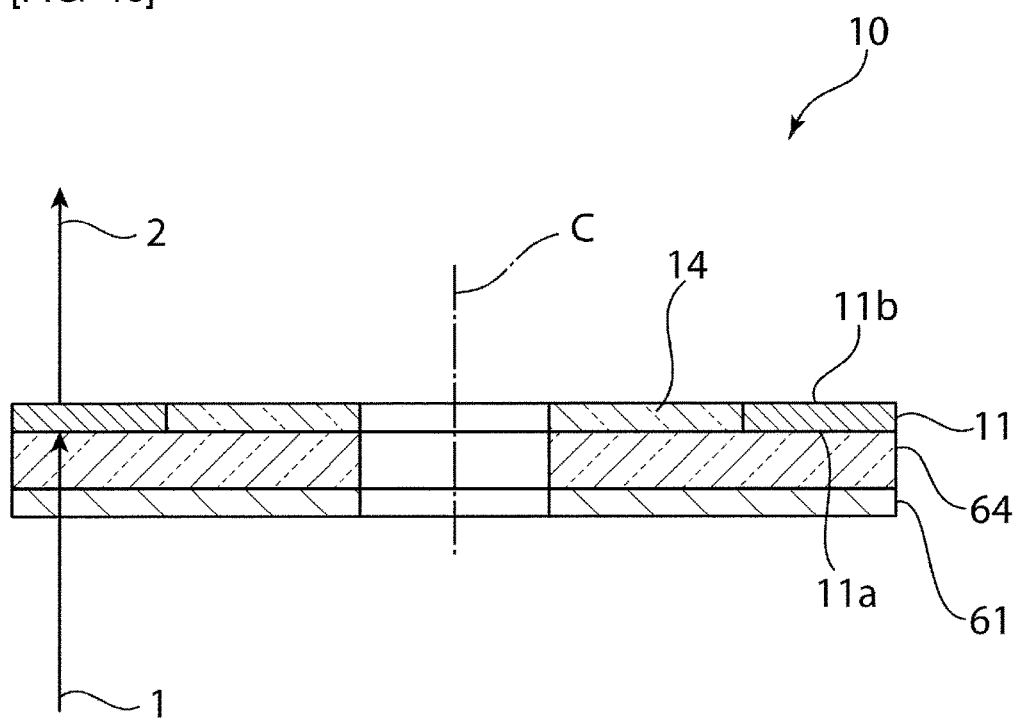

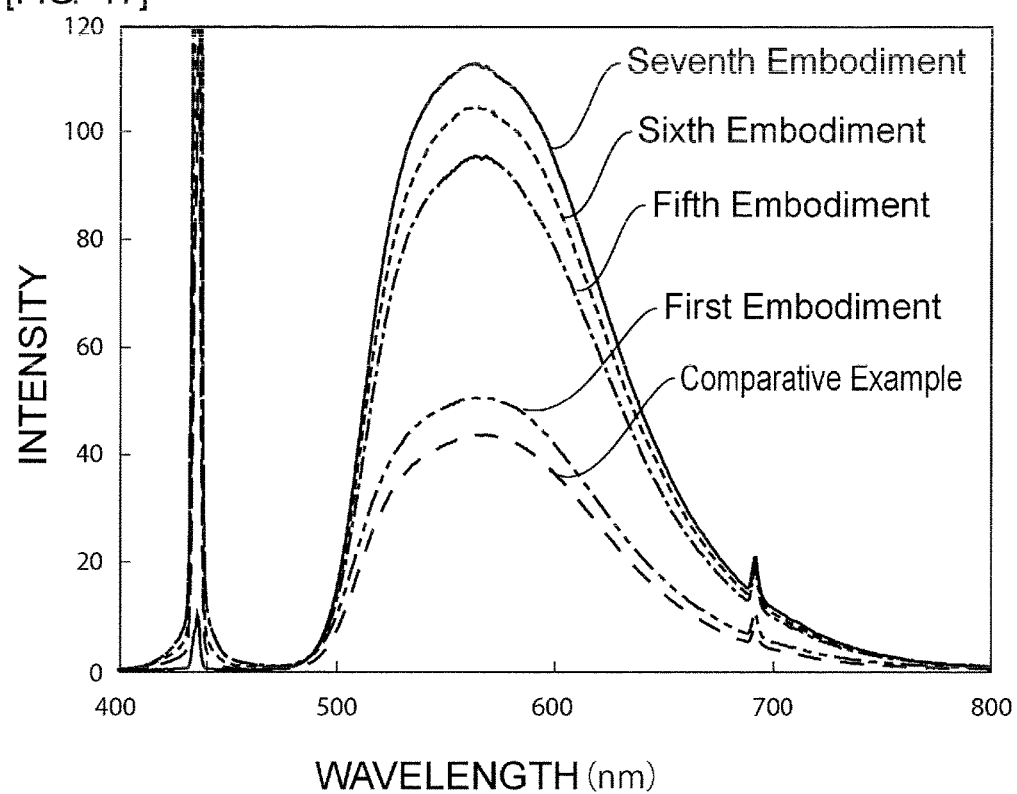

[FIG. 18]
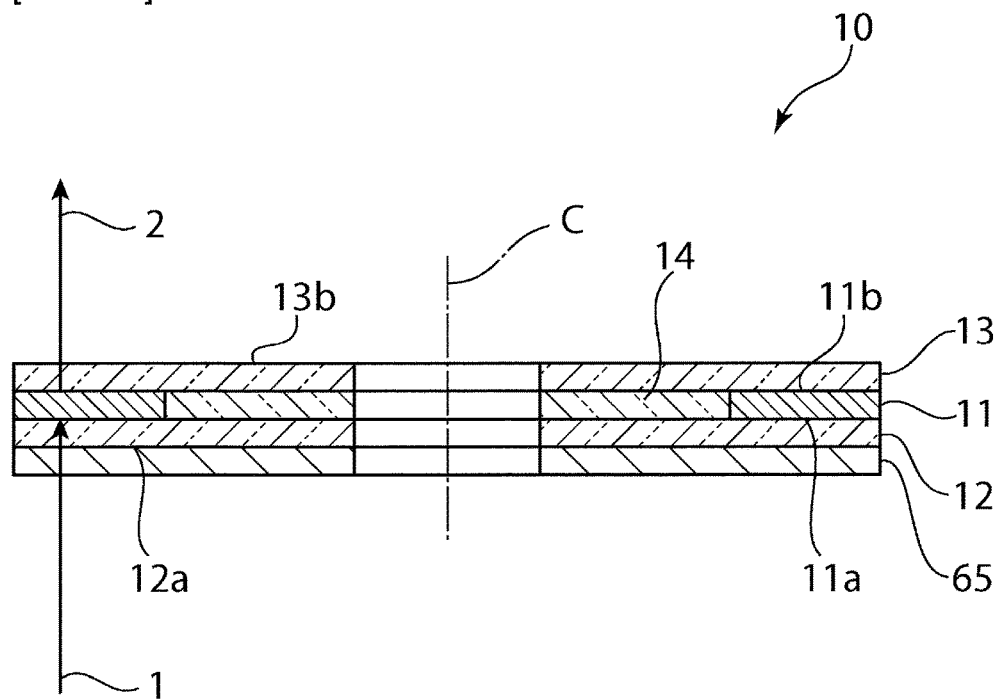
[FIG. 19]
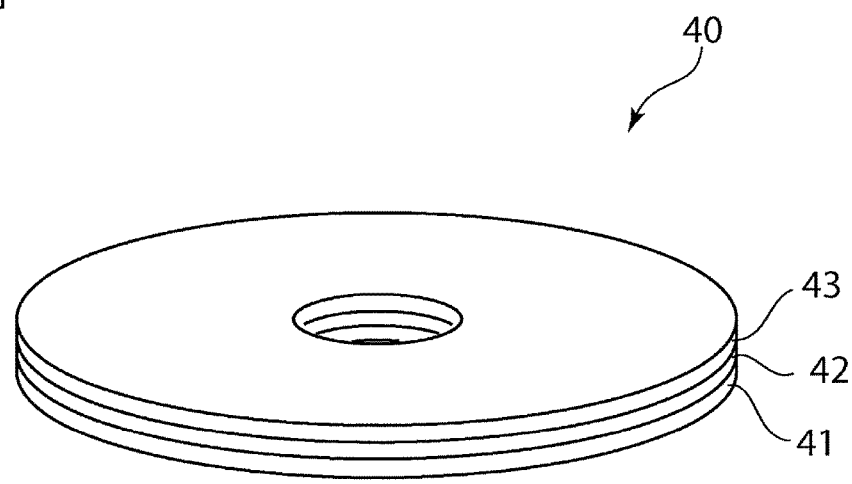

[FIG. 20]
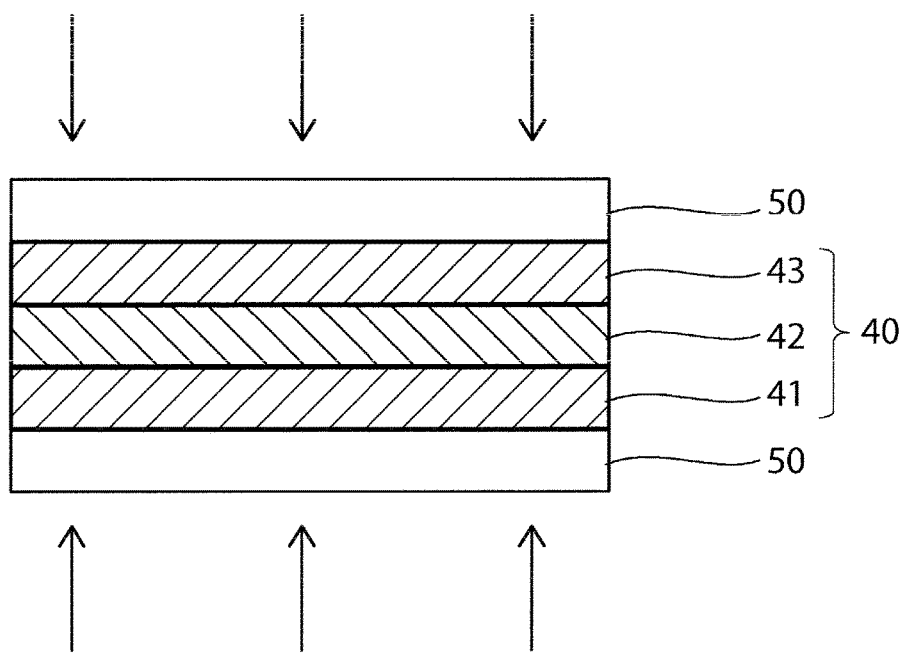

[FIG. 21]
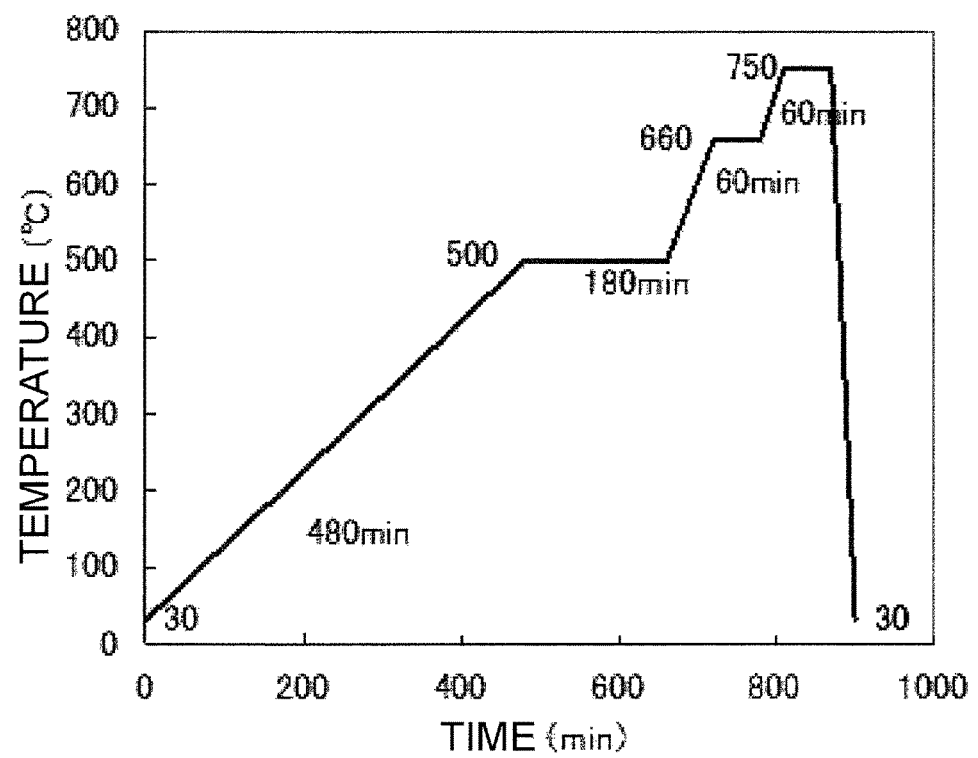

US 10,365,553 B1

PROJECTOR-USE LUMINESCENT WHEEL AND MANUFACTURING METHOD THEREFOR, AND PROJECTOR-USE LIGHT EMITTING DEVICE

TECHNICAL FIELD

This invention relates to luminescent wheels for projectors, manufacturing methods therefor, and light emitting devices for projectors.

BACKGROUND ART

To reduce projector size, there have recently been proposed light emitting devices in which an LED (light emitting diode) and a phosphor are used. For example, Patent Literature 1 discloses a projector in which use is made of a light emitting device including: a light source configured to emit ultraviolet light; and a phosphor layer configured to convert the ultraviolet light from the light source into visible light. In Patent Literature 1, a luminescent wheel is used which is produced by providing an annular phosphor layer on an annular rotatable transparent substrate.

CITATION LIST

Patent Literature

[PTL 1]
JP-A-2004-341105

SUMMARY OF INVENTION

Technical Problem

It is known that the higher the phosphor concentration in a phosphor layer is, the more the luminescence efficiency can be increased. Therefore, at the same amount of phosphor used, smaller amount of dispersion medium and thus thinner phosphor layer can increase the luminescence efficiency more. However, if the phosphor layer is reduced in thickness, this presents the problem that the phosphor layer is decreased in mechanical strength and may be broken.

An object of the present invention is to provide a luminescent wheel for a projector, which has a novel structure in which the phosphor layer is hard to break even if it is reduced in thickness; a manufacturing method therefor; and a light emitting device for a projector.

Solution to Problem

A luminescent wheel for a projector according to the present invention includes: a phosphor layer which has a first principal surface and a second principal surface located on an opposite side to the first principal surface and is capable of being excited by the entry of excitation light to emit fluorescence; a first glass layer provided on the first principal surface of the phosphor layer; and a second glass layer provided on the second principal surface of the phosphor layer.

The phosphor layer preferably has a thickness in a range of 30 to 200 μm.

Each of the first glass layer and the second glass layer preferably has a thickness in a range of 5 to 300 μm.

Each of the first glass layer and the second glass layer more preferably has a thickness in a range of 10 to 150 μm.

The phosphor layer preferably contains a glass matrix and a phosphor dispersed in the glass matrix.

Glass constituting the first glass layer or the second glass layer preferably has a coefficient of thermal expansion in a range of a coefficient of thermal expansion of glass constituting the glass matrix$-50\times10^{-7}/^\circ$ C. to a coefficient of thermal expansion of glass constituting the glass matrix$+50\times10^{-7}/^\circ$ C.

Glass constituting the first glass layer or the second glass layer preferably has a softening point higher than glass constituting the glass matrix.

The first glass layer and/or the second glass layer preferably has a chemically strengthened layer.

The phosphor layer preferably has an annular shape.

A reflective layer formed of a metal film or a dielectric multi-layer may be provided on the first glass layer.

A first wavelength-selective layer may be provided on a side of the phosphor layer where the excitation light enters. The first wavelength-selective layer is preferably configured to transmit the excitation light and reflect the fluorescence.

A second wavelength-selective layer may be provided on a side of the phosphor layer where the fluorescence exits. The second wavelength-selective layer is preferably configured to transmit the fluorescence and reflect the excitation light.

An antireflection film may be provided on a side of the phosphor layer where the fluorescence exits.

A manufacturing method according to the present invention is a method for manufacturing the above-described luminescent wheel for a projector according to the present invention, the method including the steps of: producing a laminate in which a second green sheet to be a phosphor layer is laid on top of a first green sheet to be a first glass layer and a third green sheet to be a second glass layer is laid on top of the second green sheet; and firing the laminate to form the first green sheet, the second green sheet, and the third green sheet into the first glass layer, the phosphor layer, and the second glass layer, respectively.

The laminate may have a wheel shape.

The method may further include the step of processing the fired laminate into a wheel shape.

The method may further include the step of chemically strengthening the first glass layer and/or the second glass layer of the fired laminate.

A light emitting device for a projector according to the present invention includes the above-described luminescent wheel for a projector according to the present invention and a light source capable of irradiating the phosphor layer of the luminescent wheel with the excitation light.

Advantageous Effects of Invention

In the present invention, the phosphor layer in the luminescent wheel is hard to break even if it is reduced in thickness.

BRIEF DESCRIPTION OF DRAWINGS

FIG. 1 is a perspective view showing a luminescent wheel for a projector according to a first embodiment of the present invention.

FIG. 2 is a cross-sectional view along the line A-A shown in FIG. 1, showing the luminescent wheel for a projector according to the first embodiment of the present invention.

FIG. 3 is a cross-sectional view showing a luminescent wheel for a projector according to a second embodiment of the present invention.

FIG. 4 is a cross-sectional view showing a luminescent wheel for a projector according to a third embodiment of the present invention.

FIG. 5 is a partial cross-sectional view showing on an enlarged scale the vicinity of a phosphor layer in any one of the luminescent wheels for projectors according to the first to third embodiments of the present invention.

FIG. 6 is a schematic side view showing a light emitting device for a projector in which any one of the luminescent wheels for projectors according to the first to third embodiments of the present invention is used.

FIG. 7 is a cross-sectional view showing a luminescent wheel for a projector according to a fourth embodiment of the present invention.

FIG. 8 is a partial cross-sectional view showing on an enlarged scale a phosphor layer in the luminescent wheel for a projector according to the fourth embodiment of the present invention.

FIG. 9 is a schematic side view showing a light emitting device for a projector in which the luminescent wheel for a projector according to the fourth embodiment of the present invention is used.

FIG. 10 is a cross-sectional view showing a luminescent wheel for a projector according to a fifth embodiment of the present invention.

FIG. 11 is a graph showing the relation between wavelength and transmittance in a first wavelength-selective layer in the present invention.

FIG. 12 is a cross-sectional view showing a luminescent wheel for a projector according to a sixth embodiment of the present invention.

FIG. 13 is a graph showing the relation between wavelength and reflectance in an antireflection film in the present invention.

FIG. 14 is a cross-sectional view showing a luminescent wheel for a projector according to a seventh embodiment of the present invention.

FIG. 15 is a graph showing the relation between wavelength and transmittance in a second wavelength-selective layer in the present invention.

FIG. 16 is a cross-sectional view showing a luminescent wheel for a projector according to a comparative example.

FIG. 17 is a graph showing the relation between wavelength and luminescence intensity in the first and fifth to seventh embodiments of the present invention and the comparative example.

FIG. 18 is a cross-sectional view showing a luminescent wheel for a projector according to an eighth embodiment of the present invention.

FIG. 19 is a perspective view showing a laminate for use in manufacturing the luminescent wheels for projectors according to the embodiments of the present invention.

FIG. 20 is a cross-sectional view showing an example of a method for firing the laminate in an embodiment of a manufacturing method according to the present invention.

FIG. 21 is a graph showing a firing profile for firing the laminate in the embodiment of the manufacturing method according to the present invention.

DESCRIPTION OF EMBODIMENTS

Hereinafter, a description will be given of preferred embodiments. However, the following embodiments are simply illustrative and the present invention is not intended to be limited to the following embodiments. In the drawings, elements having substantially the same functions may be referred to by the common references.

First to Third Embodiments

FIG. 1 is a perspective view showing a luminescent wheel for a projector according to a first embodiment of the present invention. FIG. 2 is a cross-sectional view along the line A-A shown in FIG. 1. As shown in FIGS. 1 and 2, a luminescent wheel 10 has an annular shape. The luminescent wheel 10 includes: a phosphor layer 11; a first glass layer 12 provided on a first principal surface 11a of the phosphor layer 11; and a second glass layer 13 provided on a second principal surface 11b of the phosphor layer 11. All of the phosphor layer 11, the first glass layer 12, and the second glass layer 13 have an annular shape. The luminescent wheel 10 is used to allow it to rotate about a central axis C.

As shown in FIG. 2, in this embodiment, the inside diameter of the annular shape of the phosphor layer 11 is greater than that of the annular shape of each of the first glass layer 12 and the second glass layer 13. Disposed on the inside the annular shape of the phosphor layer 11 is, as shown in FIG. 2, an insertion layer 14 having approximately the same thickness as the phosphor layer 11 in order to maintain the thickness uniformity of the luminescent wheel 10. Like the phosphor layer 11, the insertion layer 14 is located between the first glass layer 12 and the second glass layer 13.

FIG. 3 is a cross-sectional view showing a luminescent wheel for a projector according to a second embodiment of the present invention and corresponding to FIG. 2. As shown in FIG. 3, in this embodiment, the inside diameter of the annular shape of the phosphor layer 11 is configured to be equal to that of the annular shape of each of the first glass layer 12 and the second glass layer 13. Therefore, no insertion layer 14 is provided.

FIG. 4 is a cross-sectional view showing a luminescent wheel for a projector according to a third embodiment of the present invention and corresponding to FIG. 2. As shown in FIG. 4, in this embodiment, like the first embodiment, the inside diameter of the annular shape of the phosphor layer 11 is greater than that of the annular shape of each of the first glass layer 12 and the second glass layer 13. In an inward region of the annular shape of the phosphor layer 11 in this embodiment, the first glass layer 12 and the second glass layer 13 are in contact with each other. Therefore, the thickness of the luminescent wheel 10 in the inward region of the annular shape of the phosphor layer 11 (the region free of the phosphor layer 11) is thinner than that of the luminescent wheel 10 in the region where the phosphor layer 11 exists.

In the present invention, the luminescent wheel has a structure in which the phosphor layer 11 is provided and sandwiched between the first glass layer 12 and the second glass layer 13. Therefore, the phosphor layer 11 is hard to break even if it is reduced in thickness. For example, if a phosphor layer is provided only on one principal surface of a glass substrate, the resultant luminescent wheel may cause defects, such as a warpage, owing to a stress difference between the glass substrate and the phosphor layer. To prevent the occurrence of such defects, the thickness of the glass substrate needs to be increased. In contrast, in the present invention, since the first glass layer 12 and the second glass layer 13 are provided on both the principal surfaces of the phosphor layer 11, a balance of stress can be kept between both the principal surfaces of the phosphor layer 11, so that occurrence of a warpage or other defects can be prevented in the luminescent wheel 10. Thus, the glass layer 12 and the glass layer 13 can also be reduced in thickness, which makes it easy to achieve a reduction in entire thickness of the luminescent wheel 10. Furthermore, as described previously, if a phosphor layer is provided only on one principal surface of a glass substrate, the thickness of the glass substrate needs to be increased, in which case excitation light or fluorescence is likely to propagate through the glass substrate and leak from the end surfaces of the glass substrate to the outside. Unlike this, in the present invention, since the glass layer 12 and the glass layer 13 can be easily reduced in thickness, it can be suppressed that excitation light or fluorescence leaks to the outside.

FIG. 5 is a partial cross-sectional view showing on an enlarged scale the vicinity of the phosphor layer in any one of the luminescent wheels for projectors according to the first to third embodiments of the present invention. As shown in FIG. 5, the phosphor layer 11 is composed of a glass matrix 16 and a phosphor 15 dispersed in the glass matrix 16. In this embodiment, an inorganic phosphor is used as the phosphor 15.

No particular limitation is placed on the type of the glass matrix 16 so long as it can be used as a dispersion medium for the phosphor 15, such as an inorganic phosphor. Examples that can be used include borosilicate-based glasses and phosphate-based glasses. The softening point of the glass matrix is preferably 250° C. to 1000° C. and more preferably 300° C. to 850° C.

No particular limitation is placed on the type of the phosphor 15 so long as it can emit fluorescence upon entry of excitation light. Specific examples of the phosphor 15 that can be cited include one or more selected from the group consisting of, for example, oxide phosphor, nitride phosphor, oxynitride phosphor, chloride phosphor, oxychloride phosphor, sulfide phosphor, oxysulfide phosphor, halide phosphor, chalcogenide phosphor, aluminate phosphor, halophosphoric acid chloride phosphor, and garnet-based compound phosphor. With the use of blue light as excitation light, a phosphor capable of emitting as fluorescence, for example, green light or yellow light can be used.

The content of the phosphor 15 in the phosphor layer 11 is preferably in a range of 5 to 80% by volume, more preferably in a range of 10 to 75% by volume, and still more preferably in a range of 20 to 70% by volume.

The average particle size of the phosphor 15 is preferably 1 µm to 50 µm and more preferably 5 µm to 25 µm. If the average particle size of the phosphor 15 is too small, the luminescence intensity may be decreased. On the other hand, if the average particle size of the phosphor 15 is too large, the luminescent color may be uneven.

The thickness of the phosphor layer 11 is preferably small to the extent that excitation light can be surely absorbed into the phosphor. The reason for this is that if the phosphor layer 11 is too thick, scattering and absorption of light in the phosphor layer 11 may become too much, so that the efficiency of emission of fluorescence may be low. Specifically, the thickness of the phosphor layer 11 is preferably in a range of 30 to 200 µm, more preferably in a range of 50 to 150 µm, and still more preferably in a range of 60 to 100 µm.

The first glass layer 12 and the second glass layer 13 are made of glass. No particular limitation is placed on the type of glass constituting the first glass layer 12 and the second glass layer 13 and examples that can be cited include $SiO_2$—$B_2O_3$—$R'_2O$-based glasses (where R represents Mg, Ca, Sr or Ba), $SiO_2$—$B_2O_3$—$R'_2O$-based glasses (where R' represents Li, Na or K), $SiO_2$—$B_2O_3$—RO—$R'_2O$-based glasses, $SnO$—$P_2O_5$-based glasses, $TeO_2$-based glasses, and $Bi_2O_3$-based glasses.

The thickness of each of the first glass layer 12 and the second glass layer 13 is preferably in a range of 5 to 300 µm, more preferably in a range of 10 to 200 µm, still more preferably in a range of 10 to 150 µm, particularly preferably in a range of 10 to 100 µm, and most preferably in a range of 10 to 50 µm. If the thicknesses of the first glass layer 12 and the second glass layer 13 are too small, the mechanical strength of the luminescent wheel 10 may be insufficient. If the thicknesses of the first glass layer 12 and the second glass layer 13 are too large, fluorescence emitted from the phosphor layer 11 is likely to propagate through the glass layer 12 and leak from the end surfaces of the glass layer 12 to the outside.

The coefficient of thermal expansion of glass constituting the first glass layer 12 or the second glass layer 13 is preferably in a range of a coefficient of thermal expansion of glass constituting the glass matrix $16-50\times10^{-7}/°$ C. to a coefficient of thermal expansion of glass constituting the glass matrix $16+50\times10^{-7}/°$ C., and more preferably in a range of a coefficient of thermal expansion of glass constituting the glass matrix $16-30\times10^{-7}/°$ C. to a coefficient of thermal expansion of glass constituting the glass matrix $16+30\times10^{-7}/°$ C. The reason for this is that it can be prevented that during firing a warpage occurs in the luminescent wheel 10 owing to a difference in rate of thermal contraction between the first glass layer 12 or the second glass layer 13 and the phosphor layer 11. In order to give a compressive stress to the first glass layer 12 or the second glass layer 13 after the firing, the coefficient of thermal expansion of glass constituting the first glass layer 12 or the second glass layer 13 is preferably equal to or lower than that of glass constituting the glass matrix 16.

No particular limitation is placed on the softening point of glass constituting the first glass layer 12 or the second glass layer 13 and the softening point of glass constituting the glass matrix 16 so long as they are equal to or higher than a temperature at which any binder, air bubbles, and so on contained in first to third green sheets can be sufficiently removed. However, from a viewpoint below, the softening point of the glass constituting the first glass layer 12 or the second glass layer 13 is preferably higher than that of the glass constituting the glass matrix 16. Specifically, the reason is that if the firing is performed in a state where a second green sheet to be the glass matrix 16 is sandwiched between a first green sheet to be the first glass layer 12 and a third green sheet to be the second glass layer 13, the binder, air bubbles, and so on contained in the second green sheet can be sufficiently removed before glass powders in the first and third green sheets are sintered. The difference between the softening point of the glass constituting the first glass layer 12 or the second glass layer 13 and the softening point of the glass constituting the glass matrix 16 is preferably 30 to 200° C. and more preferably 50 to 100° C.

No particular limitation is placed on the material constituting the insertion layer 14 in the first embodiment shown in FIG. 2 and an example that may be used is the same material as the glass constituting the glass matrix 16. Alternatively, the same material as the glass constituting the first glass layer 12 or the second glass layer 13 may be used. Furthermore, the material is not limited to transparent materials, such as glass, and opaque materials, such as ceramics, may be used as the material.

The first glass layer 12 and the second glass layer 13 preferably include chemically strengthened layers. If they include the chemically strengthened layers, they can give higher mechanical strength to the luminescent wheel 10. The chemically strengthened layers can be formed, for example, by using a glass containing sodium as the glass constituting the first glass layer 12 and the second glass layer 13 and subjecting the glass to an ion-exchange treatment to substitute sodium ions existing on the surfaces of the first glass layer 12 and the second glass layer 13 with potassium ions or other ions.

FIG. 6 is a schematic side view showing a light emitting device for a projector in which any one of the luminescent wheels for projectors according to the first to third embodiments of the present invention is used. A light emitting device 30 for a projector includes the luminescent wheel 10, a light source 20, and a motor 21 for rotating the luminescent wheel 10. The annular luminescent wheel 10 is attached to a rotary shaft 22 of the motor 21 rotatably in the circumferential direction with the central axis C of the rotary shaft 22 as the center of rotation.

Excitation light 1 emitted from the light source 20 passes through the first glass layer 12 of the luminescent wheel 10 and enters the phosphor layer 11 thereof. The excitation light 1 having entered the phosphor layer 11 excites the phosphor 15, so that fluorescence 2 from the phosphor 15 is emitted through the second glass layer 13. Examples of the light source 20 that can be cited include an LED light source and a laser light source.

In the case of using as the light source 20 a light source emitting blue light as excitation light, for example, a phosphor capable of being excited by blue light to emit yellow light or green light can be used as the phosphor 15 for the phosphor layer 11. It is possible to extract, from the light emitted from the phosphor layer 11, only part thereof having a desired wavelength using a filter as necessary. An annular filter may be attached to the rotary shaft 22 and rotated in synchronism with the luminescent wheel 10 to filter the emitted light.

In this embodiment, the luminescent wheel 10 is configured to rotate circumferentially. Therefore, the region being subjected to the excitation light 1 from the light source 20 always transitions, so that even if it is subjected to the excitation light 1 and heated, the heat is immediately released. Thus, the temperature rise of the luminescent wheel 10 can be suppressed.

In the luminescent wheel 10 in this embodiment, the phosphor 15 of the same type is contained in the whole area of the phosphor layer 11. However, the present invention is not limited to this form. The phosphor layer 11 may be divided into a plurality of regions along the circumferential direction thereof and the plurality of regions may contain different types of phosphors 15. Alternatively, luminescent wheels according to fifth to eighth embodiments to be described hereinafter may be used as the luminescent wheel 10 in this embodiment.

Fourth Embodiment

FIG. 7 is a cross-sectional view showing a luminescent wheel for a projector according to a fourth embodiment of the present invention. Furthermore, FIG. 8 is a partial cross-sectional view showing on an enlarged scale a phosphor layer in the luminescent wheel for a projector according to the fourth embodiment of the present invention. In this embodiment, as shown in FIGS. 7 and 8, a reflective layer 17 formed of a metal film is provided on a first glass layer 12. By providing the reflective layer 17 formed of a metal film, heat generated in the phosphor layer 11 can be released through the reflective layer 17 to the outside. Therefore, the heating of the phosphor layer 11 can be suppressed. Hence, a fluorescence intensity reduction or other inconveniences which may be caused by the heating of the phosphor layer 11 can be prevented.

The reflective layer 17 is formed of a metal film made of, for example, silver or aluminum by vapor deposition, sputtering, ion plating, plating or other processes.

A reflective metal substrate made of metal or alloy may be used as the reflective layer 17. Such a reflective metal substrate may undergo surface treatment. The preferred reflective metal substrate is that having a high reflectance and an example that can be cited is an aluminum substrate having a surface on which a reflectivity enhancing coating made of a metal oxide or other materials is formed. An example of such an aluminum substrate that can be cited include Miro (registered trademark) and Miro-Silver (registered trademark) both manufactured by Alanod. The reflective metal substrate is bonded by a bonding material to the first glass layer 12. The bonding materials that can be used are transparent materials, such as silicone resin and transparent polyimide resin.

The thickness of the reflective layer 17 is preferably in a range of 0.01 to 100 μm, more preferably in a range of 0.03 to 50 μm, and still more preferably in a range of 0.03 to 10 μm. If the thickness of the reflective layer 17 is too small, light emitted from the phosphor layer permeates the reflective layer, so that sufficient reflection properties are less likely to be obtained. If the thickness of the reflective layer 17 is too large, a difference in coefficient of thermal expansion between the reflective layer 17 and the glass layer 12 may cause breakage or warpage of the glass layer 12 while forming the reflective layer. The reflective layer 17 may be, other than the reflective layer formed of a metal film, a reflective layer formed of a dielectric reflective multi-layer. Alternatively, a highly reflective ceramic layer or a highly reflective resin layer may be used as the reflective layer 17 or in combination with a reflective layer made of metal. An example of the highly reflective ceramic layer that can be cited is a layer in which ceramic powder containing Al, Nb, Ta, La, Zr, Ce, Ga, Mg, Si, Zn or other elements is dispersed in a glass matrix.

Although in this embodiment a structure is shown in which the first embodiment shown in FIG. 2 is provided with the reflective layer 17, alternative structures are also possible in which the second embodiment shown in FIG. 3 and the third embodiment shown in FIG. 4 are provided with their respective reflective layers 17.

FIG. 9 is a schematic side view showing a light emitting device for a projector in which the luminescent wheel for a projector according to the fourth embodiment of the present invention is used. A light emitting device 31 for a projector according to this embodiment includes the luminescent wheel 10, a light source 20, and a motor 21 for rotating the luminescent wheel 10. The annular luminescent wheel 10 is attached to a rotary shaft 22 of the motor 21 rotatably in the circumferential direction with the central axis C of the rotary shaft 22 as the center of rotation.

Excitation light 1 emitted from the light source 20 passes through the second glass layer 13 of the luminescent wheel 10 and enters the phosphor layer 11 thereof. The excitation light 1 having entered the phosphor layer 11 excites the phosphor 15, so that fluorescence 2 is emitted from the phosphor 15. The fluorescence 2 having passed through the first glass layer 12 and then emitted toward the reflective layer 17 is reflected on the surface of the reflective layer 17, passes through the first glass layer 12, the phosphor layer 11, and the second glass layer 13, and is then emitted to the outside. Examples of the light source 20 that can be cited include an LED light source and a laser light source.

Also in this embodiment, in the case of using as the light source 20 a light source emitting blue light as excitation light, for example, a phosphor capable of being excited by blue light to emit yellow light or green light can be used as the phosphor 15 for the phosphor layer 11. It is possible to extract, from the light emitted from the phosphor layer 11, only part thereof having a desired wavelength using a filter as necessary. An annular filter may be attached to the rotary shaft 22 and rotated in synchronism with the luminescent wheel 10 to filter the emitted light.

In this embodiment, the luminescent wheel 10 is configured to rotate in the circumferential direction. As described previously, heat transferred from the phosphor layer 11 to the reflective layer 17 formed of a metal film is released from the reflective layer 17 to the outside. Since the luminescent wheel 10 rotates circumferentially, heat release from the reflective layer 17 to the outside is further promoted.

Fifth to Seventh Embodiments

FIG. 10 is a cross-sectional view showing a luminescent wheel for a projector according to a fifth embodiment of the present invention. In this embodiment, a first wavelength-selective layer 61 is provided on a side of the phosphor layer 11 where the excitation light 1 enters. More specifically, the first wavelength-selective layer 61 is provided on a principal surface 12a of the first glass layer 12 opposite to the phosphor layer 11. This embodiment has the same structure as the first embodiment except for the above point.

In this embodiment, the wavelength of the excitation light 1 is about 400 to about 520 nm and the wavelength of the fluorescence 2 is approximately 520 nm or above. The first wavelength-selective layer 61 is a bandpass filter capable of transmitting the excitation light 1 and reflecting the fluorescence 2. As shown in FIG. 11, the first wavelength-selective layer 61 has high transmittance for light with wavelengths of about 400 to about 520 nm and very low transmittance for visible light with wavelengths approximately 520 nm or above. The first wavelength-selective layer 61 is formed of, for example, a dielectric multi-layer in which high-refractive index dielectric films and low-refractive index dielectric films are alternately deposited on top of each other.

In using the luminescent wheel 10 according to this embodiment for a light emitting device for a projector, like the light emitting device 30 for a projector shown in FIG. 6, excitation light 1 is allowed to enter the luminescent wheel 10 from the side where the first glass layer 12 is located. The excitation light 1 passes through the first wavelength-selective layer 61 and the first glass layer 12 and then enters the phosphor layer 11. The excitation light 1 having entered the phosphor layer 11 excites the phosphor 15, so that fluorescence 2 is emitted from the phosphor 15.

At this time, the fluorescence 2 is emitted from the phosphor 15 not only in a direction toward the second principal surface 11b of the phosphor layer 11 but also in a direction toward the first principal surface 11a thereof. In this embodiment, the first wavelength-selective layer 61 is provided on the principal surface 12a of the first glass layer 12. Thus, the fluorescence 2 emitted toward the first principal surface 11a of the phosphor layer 11 can be reflected by the first wavelength-selective layer 61. The reflected fluorescence 2 is emitted through the second principal surface 11b of the phosphor layer 11. The fluorescence 2 emitted through the second principal surface 11b of the phosphor layer 11 passes through the second glass layer 13 and is then emitted from the luminescent wheel 10. To sum up, not only the fluorescence 2 emitted from the phosphor 15 toward the second principal surface 11b of the phosphor layer 11 but also the fluorescence 2 emitted from the phosphor 15 toward the first principal surface 11a can be emitted through the second principal surface 11b and then emitted from the luminescent wheel 10 to the outside. Therefore, the luminescence intensity can be effectively increased.

FIG. 12 is a cross-sectional view showing a luminescent wheel for a projector according to a sixth embodiment of the present invention. In this embodiment, an antireflection film 62 is provided on a side of the phosphor layer 11 where the fluorescence 2 exits. More specifically, the antireflection film 62 is provided on a principal surface 13b of the second glass layer 13 opposite to the phosphor layer 11. This embodiment has the same structure as the fifth embodiment except for the above point.

Also in this embodiment, like the fifth embodiment, the wavelength of the excitation light is about 400 to about 520 nm and the wavelength of the fluorescence is approximately 520 nm or above. As shown in FIG. 13, the antireflection film 62 has a reflectance of less than 1% for light of 400 to 700 nm. The antireflection film 62 is formed of, for example, a dielectric multi-layer in which a plurality of dielectric films of different refractive indices are deposited on top of each other.

The fluorescence 2 emitted from the phosphor layer 11 enters the second glass layer 13 and then reaches the principal surface 13b of the second glass layer 13. If the antireflection film 62 is not provided, part of the fluorescence 2 is reflected on the principal surface 13b of the second glass layer 13 and not emitted from the principal surface 13b. In this embodiment, the antireflection film 62 provided on the principal surface 13b of the second glass layer 13 can reduce the reflectance for the fluorescence 2 at the principal surface 13b of the second glass layer 13. Therefore, the luminescence intensity can be more increased.

FIG. 14 is a cross-sectional view showing a luminescent wheel for a projector according to a seventh embodiment of the present invention. In this embodiment, a second wavelength-selective layer 63 is provided on a side of the phosphor layer 11 where the fluorescence 2 exits. More specifically, the second wavelength-selective layer 63 is provided on a principal surface 13b of the second glass layer 13 opposite to the phosphor layer 11. This embodiment has the same structure as the fifth embodiment except for the above point.

Also in this embodiment, like the fifth embodiment, the wavelength of the excitation light is about 400 to about 520 nm and the wavelength of the fluorescence is approximately 520 nm or above. The second wavelength-selective layer 63 is a bandpass filter capable of reflecting the excitation light 1 and transmitting the fluorescence 2. As shown in FIG. 15, the second wavelength-selective layer 63 has high transmittance for visible light approximately 450 nm or above and very low transmittance for visible light approximately 450 nm or below. The second wavelength-selective layer 63 is formed of, for example, a dielectric multi-layer in which high-refractive index dielectric films and low-refractive index dielectric films are alternately deposited on top of each other.

Part of the excitation light 1 having entered the phosphor layer 11 may pass through the second glass layer 13, without exciting the phosphor 15, and be emitted to the outside. In this embodiment, the second wavelength-selective layer 63 is provided on the principal surface of the second glass layer 13 opposite to the phosphor layer 11. Therefore, the excitation light 1 having entered the second glass layer 13 passes through the second glass layer 13, reaches the second wavelength-selective layer 63, and is then reflected by the second wavelength-selective layer 63. The reflected excitation light 1 passes through the second glass layer 13, enters the phosphor layer 11, and excites the phosphor 15. By in this manner reflecting the excitation light 1 on the second wavelength-selective layer 63 and confining the excitation light 1, the phosphor 15 can be more excited. Therefore, the luminescence intensity can be more effectively increased.

(Evaluation of Luminescence Intensity)

The luminescence intensities of the luminescent wheels for projectors according to the first and fifth to seventh embodiments and a comparative example were measured and evaluated. As shown in FIG. 16, the luminescent wheel according to the comparative example is configured so that in the fifth embodiment no second glass layer is provided and a glass substrate 64 is used in place of the first glass layer. The first wavelength-selective layer 61 is provided on the glass substrate 64.

The thicknesses of the layers and the glass substrate of the above luminescent wheels for projectors were as follows: In the first and fifth to seventh embodiments, the thickness of each of the first and second glass layers 12, 13 was 20 µm and the thickness of the phosphor layer 11 was 80 µm. In the comparative example, the thickness of the glass substrate 64 was 300 µm and the thickness of the phosphor layer 11 was 80 µm. The wavelength of excitation light 1 entering each of the luminescent wheels for projectors was 436 nm. A YAG phosphor emitting yellow light upon application of blue excitation light was used as the phosphor 15 for the phosphor layer 11. The luminescence intensity was measured by focusing light emitted from each luminescent wheel on a photoreceiver using a lens.

FIG. 17 is a graph showing the relation between wavelength and luminescence intensity in the luminescent wheels for projectors according to the first and fifth to seventh embodiments of the present invention and the comparative example. The solid line indicates the seventh embodiment, the short-dashed line indicates the sixth embodiment, the dash-single-dot line indicates the fifth embodiment, the dash-double-dot line indicates the first embodiment, the long-dashed line indicates the comparative example.

As shown in FIG. 17, the luminescence intensities in the first and fifth to seventh embodiments are higher than that in the comparative example. In the first and fifth to seventh embodiments, the thickness of the first glass layer 12 is smaller than that of the glass substrate 64 in the comparative example. This can make it difficult to leak the fluorescence 2 from the end surfaces of the first glass layer 12 to the outside. Therefore, it can be considered that, for this reason, the luminescence intensities in the first and fifth to seventh embodiments are increased.

As shown in FIG. 17, the luminescence intensities in the fifth to seventh embodiments are higher than that in the first embodiment. In the fifth to seventh embodiments, the first wavelength-selective layer 61 provided on the principal surface 12a of the first glass layer 12 can reflect the fluorescence 2 emitted toward the first glass layer 12. Therefore, it can be considered that, for this reason, the luminescence intensities in the fifth to seventh embodiments can be higher than that in the first embodiment.

As shown in FIG. 17, the luminescence intensity in the sixth embodiment is higher than that in the fifth embodiment. In the sixth embodiment, by the provision of the antireflection film 62 on the principal surface 13b of the second glass layer 13, the reflectance for the fluorescence 2 at the principal surface 13b of the second glass layer 13 can be reduced, so that the luminescence intensity can be further increased.

It can be seen, as shown in FIG. 17, that the luminescence intensity in the seventh embodiment is highest. In the seventh embodiment, the second wavelength-selective layer 63 provided on the principal surface 13b of the second glass layer 13 reflects the excitation light 1 to further excite the phosphor 15, so that the luminescence intensity can be further increased. Meanwhile, the peak around a wavelength of 436 nm corresponds to a peak of the excitation light 1 emitted from the second principal surface 11b of the phosphor layer 11. The intensity around a wavelength of 436 nm in the seventh embodiment is lowest. This indicates that the excitation light 1 was reflected by the second wavelength-selective layer 63.

Eighth Embodiment

FIG. 18 is a cross-sectional view showing a luminescent wheel for a projector according to an eighth embodiment of the present invention. This embodiment is different from the first embodiment in that a heat dissipation member 65 is provided on the principal surface 12a of the first glass layer 12 opposite to the phosphor layer 11. This embodiment has the same structure as the first embodiment except for the above point.

The heat dissipation member 65 is transparent and has a higher thermal conductivity than the first glass layer 12. The heat dissipation member 65 is made of, for example, sapphire, spinel or aluminum nitride. In this embodiment, heat generated in the phosphor layer 11 can be released through the heat dissipation member 65 to the outside. Therefore, the heating of the phosphor layer 11 can be suppressed. Hence, a fluorescence intensity reduction or other inconveniences caused by the heating of the phosphor layer 11 can be prevented.

When excitation light 1 is allowed to enter the phosphor layer 11 through the first glass layer 12, the phosphor 15 in the phosphor layer 11 located closer to the first glass layer 12 is more likely to be excited than the phosphor 15 therein located closer to the second glass layer 13. In other words, heat is more likely to be generated in a portion of the phosphor layer 11 closer to the first glass layer 12. In this embodiment, the heat dissipation member 65 is provided on the side where the first glass layer 12 more likely to generate heat is located. Thus, when the excitation light 1 is allowed to enter the phosphor layer through the first glass layer 12, the heat dissipation properties can be particularly effectively increased to prevent a fluorescence intensity reduction or other inconveniences.

Furthermore, when the outside environment is the air, the heat dissipation member 65, which is made of sapphire, spinel, aluminum nitride or the like, has a higher refractive index than the outside. Therefore, reflection loss at the interface between the outside and the heat dissipation member 65 can be reduced to effectively increase the luminescence intensity.

The heat dissipation member 65 preferably has, as with sapphire, spinel or aluminum nitride, a higher refractive index than glass constituting the first glass layer 12. Thus, reflection loss at the interface between the heat dissipation member 65 and the glass layer 12 can be reduced.

The heat dissipation member 65 may be bonded through a bonding material or the like to the first glass layer 12 or may be bonded through no bonding material to the first glass layer 12. The bonding materials that can be used are, for example, like the fourth embodiment, transparent materials, such as silicone resin and transparent polyimide resin. For bonding together of the heat dissipation member 65 and the first glass layer 12 through no bonding material, they can be bonded, for example, during formation of the first glass layer 12. More specifically, as will be described hereinafter, while a first green sheet to be the first glass layer 12 is heated to the softening point or above, the heat dissipation member 65 can be bonded to the first green sheet.

The heat dissipation member 65 may be provided on the first wavelength-selective layer 61. The heat dissipation member 65 and the first wavelength-selective layer 61 can be bonded together with, for example, a bonding material. Also in this case, the heat dissipation properties can be effectively increased to prevent a fluorescence intensity reduction or other inconveniences.

(Manufacturing Method)

Each of the luminescent wheels for projectors according to the above embodiments can be produced, for example, by producing a laminate in which green sheets are laid on top of each other and firing the laminate. Specifically, this manufacturing method includes the steps of: producing a laminate in which a second green sheet to be the phosphor layer 11 is laid on top of a first green sheet to be the first glass layer 12 and a third green sheet to be the second glass layer 13 is laid on top of the second green sheet; and firing the laminate to form the first green sheet, the second green sheet, and the third green sheet into the first glass layer 12, the phosphor layer 11, and the second glass layer 13, respectively. However, the luminescent wheel for a projector according to the present invention is not limited to that manufactured by this manufacturing method.

FIG. 19 is a perspective view showing a laminate for use in manufacturing each of the luminescent wheels for projectors according to the above embodiments. The laminate 40 includes a first green sheet 41 to be the first glass layer 12, a second green sheet 42 to be the phosphor layer 11, and a third green sheet 43 to be the second glass layer 13 and is configured so that the second green sheet 42 is laid on top of the first green sheet 41 and the third green sheet 43 is laid on top of the second green sheet 42.

The laminate 40 shown in FIG. 19 has already a wheel shape. Such a laminate 40 can be manufactured, for example, by laying rectangular green sheets on top of each other to produce a rectangular laminate and punching the laminate into a wheel shape. Alternatively, the laminate can be produced by laying green sheets formed in an annular shape on top of each other.

The second green sheet 42 can be produced, for example, in the following manner. The second green sheet 42 can be produced by applying a slurry containing glass particles to be the glass matrix 16, the phosphor 15, and organic compounds such as a binder resin and a solvent to a resin film made of polyethylene terephthalate or other materials by the doctor blade method or other methods and then drying the slurry by the application of heat.

The first green sheet 41 and the third green sheet 43 can be produced, for example, in the following manner. Each of the first green sheet 41 and the third green sheet 43 can be produced by applying a slurry containing glass particles to be the first glass layer 12 or second glass layer 13 and organic compounds such as a binder resin and a solvent to a resin film made of polyethylene terephthalate or other materials by the doctor blade method or other methods and then drying the slurry by the application of heat.

FIG. 20 is a cross-sectional view showing an example of a method for firing the laminate in an embodiment of the manufacturing method according to the present invention. As shown in FIG. 20, ceramic sheets 50 made of alumina or other materials are disposed on both the first green sheet 41 and the third green sheet 43 so as to sandwich the laminate 40 between the ceramic sheets 50. In this state, the ceramic sheets 50 disposed on the top and bottom of the laminate 40 are pressed against the laminate 40 to come close to each other and the laminate 40 is fired with the application of a constraining force thereto, resulting in non-shrinkage firing.

FIG. 21 is a graph showing a firing profile for firing the laminate in the embodiment of the manufacturing method according to the present invention. As shown in FIG. 21, first, the temperature is raised from 30° C. to 500° C. in 480 minutes. Next, the laminate is fired for 180 minutes while the temperature is maintained at 500° C. By firing the laminate 40 at this temperature, the binder and so on are removed from the whole of the laminate 40.

Next, the temperature is raised to 660° C. and the laminate 40 is then fired for 60 minutes while this temperature is maintained. This temperature is higher than the softening point of the glass contained in the second green sheet 42, that is, the glass constituting the glass matrix 16, and lower than the softening point of the glass contained in the first green sheet 41 and third green sheet 43, that is, the glass constituting the first glass layer 12 and third glass layer 13. Therefore, by firing the laminate 40 at this temperature, the binder and so on can be fully removed from the second green sheet 42 to be the phosphor layer 11.

Next, the temperature is raised to 750° C. and the laminate 40 is then fired for 60 minutes while this temperature is maintained. This temperature is higher than the softening point of the glass constituting the first glass layer 12 and third glass layer 13. Therefore, by firing the laminate 40 at this temperature, the binder and so on can be fully removed from the first green sheet 41 and third green sheet 43 to be the first glass layer 12 and second glass layer 13, respectively.

In the above manner, the laminate 40 can be fired. The surface of the fired laminate 40 can be mirror polished as necessary. The laminate 40 may be further fired in vacuum, as necessary. By chemically strengthening the fired laminate 40 by ion exchange, the mechanical strength of the luminescent wheel can be further increased.

Although in the above embodiment a laminate previously having a wheel shape is fired, a laminate after being fired may be subjected to processing, such as machining, to have a wheel shape.

Although in the above embodiment the phosphor layer 11, the first glass layer 12, and the second glass layer 13 are formed using green sheets, the present invention is not limited to this. For example, they may be formed by applying a paste, a coating or the like to a substrate and subjecting the coating to heat treatment. In the manners thus far described, the luminescent wheels for projectors according to the first to fourth embodiments can be manufactured.

A description will be given below of methods for manufacturing the luminescent wheels for projectors according to the fifth to seventh embodiments. In the same manner as in the above-described method for manufacturing the luminescent wheel for a projector according to each of the first to fourth embodiments, the first glass layer 12, the phosphor layer 11, and the second glass layer 13 are formed. Next, the first wavelength-selective layer 61 is formed on top of the principal surface 12a of the first glass layer 12, for example, by vacuum deposition or sputtering. More specifically, for example, high-refractive index dielectric films and low-refractive index dielectric films are alternately deposited on top of each other to form the first wavelength-selective layer 61 formed of a dielectric multi-layer. In this manner, the luminescent wheel for a projector according to the fifth embodiment can be manufactured.

In the sixth and seventh embodiments, next, a dielectric multi-layer is formed on top of the principal surface 13b of the second glass layer 13, for example, by vacuum deposition or sputtering. In manufacturing the luminescent wheel for a projector according to the sixth embodiment, the antireflection film 62 formed of a dielectric multi-layer is formed by, for example, depositing a plurality of dielectric films having different refractive indices on top of each other. In manufacturing the luminescent wheel for a projector according to the seventh embodiment, the second wavelength-selective layer 63 formed of a dielectric multi-layer is formed by, for example, alternately depositing high-refractive index dielectric films and low-refractive index dielectric films on top of each other.

A description will be given below of a method for manufacturing the luminescent wheel for a projector according to the eighth embodiment. In the same manner as in the method for manufacturing the luminescent wheel for a projector according to each of the first to fourth embodiments, the laminate 40 composed of the first to third green sheets 41 to 43 are formed and the laminate 40 is fired according to the firing profile of FIG. 21. While the laminate 40 is fired at 750° C. and the first green sheet 41 is heated at the softening point or above, the heat dissipation member 65 is bonded to the first green sheet 41. In this case, the heat dissipation member 65 is preferably bonded to the first green sheet 41 after the binder and so on are fully removed from the first green sheet 41.

Alternatively, after the first glass layer 12, the phosphor layer 11, and the second glass layer 13 are formed in the same manner as in the method for manufacturing the luminescent wheel for a projector according to each of the first to fourth embodiments, the heat dissipation member 65 may be bonded to the first glass layer 12. In this case, the heat dissipation member 65 is bonded to the first glass layer 12, for example, through a bonding material.

REFERENCE SIGNS LIST

1 . . . excitation light
2 . . . fluorescence
10 . . . luminescent wheel
11 . . . phosphor layer
11a, 11b . . . first and second principal surfaces
12, 13 . . . first and second glass layers
12a . . . principal surface
13b . . . principal surface
14 . . . insertion layer
15 . . . phosphor
16 . . . glass matrix
17 . . . reflective layer
20 . . . light source
21 . . . motor
22 . . . rotary shaft
30, 31 . . . light emitting device for projector
40 . . . laminate
41 to 43 . . . first to third green sheets
50 . . . ceramic sheet
61 . . . first wavelength-selective layer
62 . . . antireflection film
63 . . . second wavelength-selective layer
64 . . . glass substrate
65 . . . heat dissipation member

The invention claimed is:

1. A luminescent wheel for a projector comprising:
a phosphor layer which has a first principal surface and a second principal surface located on an opposite side to the first principal surface and is capable of being excited by the entry of excitation light to emit fluorescence;
a first glass layer provided on the first principal surface of the phosphor layer so as to be in contact with the first principal surface; and
a second glass layer provided on the second principal surface of the phosphor layer so as to be in contact with the second principal surface,
wherein the phosphor layer contains a glass matrix and a phosphor dispersed in the glass matrix, and
wherein glass constituting the first glass layer or the second glass layer has a coefficient of thermal expansion in a range of a coefficient of thermal expansion of glass constituting the glass matrix$-50\times10^{-7}$/° C. to a coefficient of thermal expansion of glass constituting the glass matrix$+50\times10^{-7}$/° C.

2. The luminescent wheel for a projector according to claim 1, wherein the phosphor layer has a thickness in a range of 30 to 200 μm.

3. The luminescent wheel for a projector according to claim 1, wherein each of the first glass layer and the second glass layer has a thickness in a range of 5 to 300 μm.

4. The luminescent wheel for a projector according to claim 1, wherein each of the first glass layer and the second glass layer has a thickness in a range of 10 to 150 μm.

5. The luminescent wheel for a projector according to claim 1, wherein glass constituting the first glass layer or the second glass layer has a softening point higher than glass constituting the glass matrix.

6. The luminescent wheel for a projector according to claim 1, wherein the first glass layer and/or the second glass layer includes a chemically strengthened layer.

7. The luminescent wheel for a projector according to claim 1, wherein the phosphor layer has an annular shape.

8. The luminescent wheel for a projector according to claim 1, wherein a reflective layer formed of a metal film or a dielectric multi-layer is provided on the first glass layer.

9. The luminescent wheel for a projector according to claim 1, wherein a first wavelength-selective layer is provided on a side of the phosphor layer where the excitation light enters, and the first wavelength-selective layer is configured to transmit the excitation light and reflect the fluorescence.

10. The luminescent wheel for a projector according to claim 1, wherein a second wavelength-selective layer is provided on a side of the phosphor layer where the fluorescence exits, and the second wavelength-selective layer is configured to transmit the fluorescence and reflect the excitation light.

11. The luminescent wheel for a projector according to claim 1, wherein an antireflection film is provided on a side of the phosphor layer where the fluorescence exits.

12. The luminescent wheel for a projector according to claim 1, wherein the first glass layer is bonded to the first principal surface of the phosphor layer by firing, and the second glass layer is bonded to the second principal surface of the phosphor layer by firing.

13. A light emitting device for a projector comprising:
the luminescent wheel for a projector according to claim 1; and
a light source capable of irradiating the phosphor layer of the luminescent wheel with the excitation light.

* * * * *